(12) United States Patent  (10) Patent No.: US 8,660,394 B2
Wells et al.  (45) Date of Patent: Feb. 25, 2014

(54) OPTICAL CABLE WITH DRY CORE AND DRY BUFFER TUBES

(75) Inventors: Ben Wells, Columbia, SC (US); John Sach, Irmo, SC (US); Martin Hanchard, Irmo, SC (US); Grant Davidson, Irmo, SC (US)

(73) Assignee: Prysmian Communications Cables and Systems USA, LLC, Lexington, SC (US)

( * ) Notice: Subject to any disclaimer, the term of this patent is extended or adjusted under 35 U.S.C. 154(b) by 372 days.

(21) Appl. No.: 13/133,571

(22) PCT Filed: Dec. 9, 2008

(86) PCT No.: PCT/US2008/086062

§ 371 (c)(1),
(2), (4) Date: Aug. 10, 2011

(87) PCT Pub. No.: WO2010/068196

PCT Pub. Date: Jun. 17, 2010

(65) Prior Publication Data

US 2011/0293230 A1  Dec. 1, 2011

(51) Int. Cl.
*G02B 6/44* (2006.01)

(52) U.S. Cl.
USPC .......................................... 385/109; 385/114

(58) Field of Classification Search
None
See application file for complete search history.

(56) References Cited

U.S. PATENT DOCUMENTS

| | | | |
|---|---|---|---|
| 4,711,523 A * | 12/1987 | Iri et al. | 385/109 |
| 4,909,592 A | 3/1990 | Arroyo et al. | |
| 6,253,012 B1 | 6/2001 | Keller et al. | |
| 6,463,199 B1 | 10/2002 | Quinn et al. | |
| 6,847,768 B2 | 1/2005 | Lail et al. | |
| 6,931,184 B2 | 8/2005 | Tedder et al. | |
| 6,970,629 B2 | 11/2005 | Lail et al. | |
| 7,006,740 B1 | 2/2006 | Parris | |
| 7,277,615 B2 | 10/2007 | Greenwood et al. | |
| 2004/0047573 A1 | 3/2004 | Lail et al. | |
| 2004/0177915 A1 | 9/2004 | Engel | |
| 2008/0169116 A1 | 7/2008 | Mullaney et al. | |
| 2008/0170832 A1 | 7/2008 | Mullaney et al. | |
| 2010/0150505 A1 * | 6/2010 | Testu et al. | 385/109 |
| 2012/0014652 A1 * | 1/2012 | Parris | 385/111 |

OTHER PUBLICATIONS

International preliminary report on patentability for PCT/US2008/086062, dated Jun. 14, 2011.*
International Search Report from the European Patent Office for International Application No. PCT/US2008/086062 (Mail date Oct. 15, 2009).
Davis et al., "Performance of Swellable Materials in High Ionic and Seawater Environments," NFOEC Paper, pp. 211-219, 1997.

* cited by examiner

*Primary Examiner* — Mike Stahl
(74) *Attorney, Agent, or Firm* — Finnegan, Henderson, Farabow, Garrett & Dunner, L.L.P.

(57) ABSTRACT

An optical fiber cable includes at least one buffer tube that includes a plurality of water-blocking plugs and an optical fiber. The water-blocking plugs can be spaced along the buffer tubes, substantially filling the cross-sectional space within the buffer tube not already filled by the optical fiber. The water-blocking plugs can provide a stronger bond between the optical fibers and the inner tube. This is reflected by a high normalized pullout force for the optical fiber, such as, above 5.0 N/m. Yet, the resulting fiber optic cable does not suffer from problems associated with a higher pullout force, such as attenuation.

18 Claims, 5 Drawing Sheets

OPTICAL CABLE WITH DRY CORE AND DRY BUFFER TUBES

CROSS REFERENCE TO RELATED APPLICATIONS

This application is a national phase application based on PCT/US2008/086062, filed Dec. 9, 2008, the content of which is incorporated herein by reference.

TECHNICAL FIELD

The present invention relates to optical fiber communication cables comprising buffer tubes that loosely receive optical fibers or optical fiber ribbons, and a method for decreasing water migration in such cables while improving the coupling bond between the optical fibers and the buffer tubes. The invention also relates to methods for manufacturing these cables and buffer tubes.

BACKGROUND

Fiber optic cables (i.e., optical cables) are commonly used for data transfer and communications in a variety of networking applications. The typical "loose tube" fiber optic cable contains at least one buffer tube, which in turn contains at least one optical fiber. Single tube cables are called "central" loose tube cables, while cables with multiple buffer tubes are called "stranded" loose tube cables.

With any type of fiber optic cable system data transmission capabilities can deteriorate due to water migration. In particular, water migration damages the integrity of the system components over time, leading to weaker transmission signals or total fiber breakage. Due to the applications for fiber optic cables in environments that may include water, the fiber optics industry emphasizes reducing water migration problems to ensure proper functionality and longer lifespan of fiber optic cable systems.

The compounds used for blocking water migration within a fiber optic cable generally separate into two classifications: (1) "filling" compounds and (2) "flooding" compounds. Filling compounds, discussed at length herein, are placed within the buffer tube. Conversely, flooding compounds block water migration outside the buffer tubes, such as between the buffer tubes and the overall jacketing layers, including the interstices.

As reported in U.S. Pat. No. 7,006,740, filling compounds used within the buffer tubes are typically distinct materials from flooding compounds used to fill the interstices outside the buffer tube. For instance, flooding compounds are often not appropriate to use within the buffer tube because the material has other properties not suitable or desirable for the filling application. Therefore, those skilled in the art distinguish between flooding compounds and filling compounds when selecting materials for the interior of a buffer tube.

The techniques described in the art for blocking water migration within buffer tubes substantially separate into three general categories: (1) using thixotropic gels as a filling compound, (2) adding super absorbent powder (SAP) within the buffer tube, and (3) adding material to create water-blocking zones within the buffer tube. All three of these solutions have their drawbacks, described below.

Thixotropic gel, as described in U.S. Pat. No. 6,847,768, is a conventional filling compound and can prevent water migration inside buffer tubes. The buffer tubes are filled with the gel, which physically blocks any flow of water longitudinally along the cable. The gel also minimizes micro bending effects by acting as a cushion for the fibers or fiber ribbons. Additionally, thixotropic gels and can help couple the fibers to the buffer tube, which is helpful in limiting movement relative to the buffer tube and cable, preventing attenuation of the optical signals within the fibers.

However, using the gels has its drawbacks. The gel should be removed from the fibers before connecting or splicing the fibers, as disclosed, for example, in U.S. Pat. No. 7,277,615. This operation is not only time consuming, but also messy. Contamination of the work space is possible and the use of consumables such as wipes and gel cleaning compounds can present disposal problems.

More recently, the optical fiber cable industry has moved to "dry" cables, which use buffer tubes including tapes or yarns that contain super absorbent powders (SAP) rather than thixotropic gels. Water-swellable tapes and yarns have also been used to block water outside the buffer tubes underneath the overall jacket. Cables using SAP elements both inside the buffer tubes and outside the buffer tubes are known as "dry-dry" cables. These cables are described, for example, in U.S. Pat. No. 4,909,592, incorporated herein by reference. That patent describes using water-swellable yarns, one type of SAP element, both inside and outside the buffer tubes to block water migration. Another example of a dry-dry optical fiber cable is disclosed in U.S. Pat. No. 6,970,629. This patent teaches the use of a compressed dry insert, made of a foam tape and a water-swellable tape, which surrounds the optical fiber ribbon in a single tube cable. The normalized ribbon pullout force taught by U.S. Pat. No. 6,970,629 is between 0.5 N/m and 5.0 N/m and more preferably from about 1 N/m to about 4.0 N/m.

Although SAP elements block water migration without the cleanup drawbacks associated with gels, SAP elements present disadvantages. For example, some SAP elements provide little coupling of the optical fibers to the inside of the buffer tube, and do not provide the cushioning effect that gels do. Without cushioning, the optical fibers are more susceptible to damage and optical loss. Additionally, poor coupling inherent in such dry-dry cables can give rise to attenuation increases because the optical fibers can be irreversibly drawn into the buffer tube if the cable stretches during installation. This could increase the fiber to buffer tube length ratio, which gives rise to attenuation at low temperatures.

SAP elements also take up space in the buffer tube, which can negatively restrict movement, present microbending attenuation effects, and require an increase in the diameter of the tubes. Additionally, because the coupling effects of SAP elements may not be as great as the gels, those skilled in the art often try to increase the coupling characteristics by using many more SAP elements than necessary for water-blocking, as reported in U.S. Pat. No. 7,277,615. But this is likely to exacerbate the other disadvantages of SAP elements described above.

Another concern with the use of SAP elements is that the swelling efficiency of the powder used in the water-blocking elements decreases with increasing ion concentration in the water, as reported in 1997 NFOEC paper, "Performance of Swellable Materials in High Ionic and Seawater environments," by J. Davis and R. Demaree. Thus, these "dry" cables can be less effective at blocking water, and require more (or larger) SAP elements, as the ionic concentration of the water increases. Considering that optical fiber cables are routinely exposed to the high ion content of dilute seawater, runoff containing road salt, and other sites, this characteristic can detract from reliable performance.

The third type of solution for preventing water migration involves providing water-blocking plugs at spaced intervals throughout the buffer tube, as described for example in U.S. Pat. Nos. 6,463,199 and 6,847,768, both of which are incorporated by reference. The water-blocking plugs are made of solid materials, physically blocking water migration.

The use of water-blocking plugs as disclosed in the art has several disadvantages. First, the introduction of the solid water-blocking plugs during manufacturing is not trivial, and can be quite expensive. Current water-blocking plugs are solid, and are difficult to insert inside the buffer tube such that they surround the optical fiber within the buffer tube. To this end, U.S. Pat. No. 6,847,768 teaches (1) cutting plugs from a continuous length of material and attaching the plugs to a portion of the buffer tube assembly during manufacture or (2) injecting the solid plug material. To prevent the collapse of the buffer tubes during manufacture, U.S. Pat. No. 6,931,184 reports on the practice of injecting thixotropic gel inside the buffer tube during the extrusion of the buffer tube around the optical waveguide, or, alternatively, using a special buffer material. In the presence of a buffer tube made of standard buffer materials that is neither fully filled, i.e. with a grease or gel, nor partially filled with continuously injected SAP elements, the buffer tube can collapse during extrusion if the plug material is not continuous and is injected during manufacture.

Second, like the aforementioned SAP elements, some of the solid water-blocking plugs do not provide for strong coupling between the optical fibers and the buffer tube. This is by design, because the hard, relatively inflexible, nature of current water-blocking plugs would cause attenuation or microbending effects if coupled too strongly to the fibers and buffer tube. As a result, the strongest coupling in cables described in the art is a normalized pullout force of less than 5.0 N/m.

"Normalized pullout force" is the pullout force measured in a certain cable length referred to as a unitary cable length.

Even though a pullout force higher than 5.0 N/m provides certain advantages, it has negative consequences on attenuation and microbending under current techniques.

Pullout force is the force required to begin movement of the optical fibers and/or ribbons longitudinally from the end of the cable, and serves as an indication of how well the fibers are coupled to the buffer tube and the cable. To meet typical customer specifications, the pullout force must be greater than 0.1625 N times the number of fibers in the ribbon stack over a 30 meter test length. Thus, for a 144 fiber ribbon stack (12 stacks of 12-fiber ribbons), the pullout force must be greater than 23.4 N, which normalizes to 0.78 N/m. For a 72-fiber ribbon stack, the pullout force must be greater than 11.7 N per 30 meters (which normalizes to 0.39 N/m.) Cables described in the art, when equipped with any of the hereinbefore described water-blocking plugs, typically exhibit normalized pullout forces of less than 5 N/m.

The pullout force is important for long-term network reliability due to elevation changes and the tendency for displacement, particularly at the low points of the cable. Adequate pullout force is also important to minimize or eliminate fiber movement during installation. Bend-induced attenuation, pulling fibers from splice trays, or, in the worst case, fiber breaks can occur due to poor fiber coupling. For central tube ribbon cables, coupling the fibers to the buffer tube is especially important because single-tube designs do not use stranded tubes (which inherently lock ribbons or fibers in place).

Third, the water-blocking plug as disclosed in U.S. Pat. No. 6,847,768, for example, provides a passage for an optical fiber ribbon stack that is slightly larger than the ribbon stack, thus providing a path of water migration. Therefore a water-swellable tape, powder, or layer may be required in the passageway around the optical fiber ribbon stack. Further, as described in U.S. Pat. No. 6,463,199, in order to cleanly strip the water-blocking plug from the optical fiber, some of the water blocking plugs described in the art may need a release layer or a controlled bond layer between the optical fiber and the water-blocking plug.

An example of one or more dry inserts blocking water and coupling the optical fibers to the tube is provided by U.S. Pat. No. 7,277,615. This patent explains that the compression of the dry insert may be in the range from about 10% to about 90% and that the ribbon pullout force is in the range of about 0.5 N/m and about 5.0 N/m, more preferably, in the range of about 1 N/m to about 4 N/m. This document teaches that the normalized pullout force for an optical ribbon in a conventional cable employing thixotropic grease or gel is about 4.8 N/m, and that ribbons in dry cables using only non-compressed SAP elements have pullout forces of 0.5 N/m or less. The normalized pullout force for a ribbon in the cables of U.S. Pat. No. 7,277,615 is between 0.5 N/m and 5.0 N/m. This art reflects the current difficulties in attaining a pullout force greater than 5.0 N/m through use of conventional water-blocking plugs, without raising the risk of microbending and attenuation to an unacceptable level.

It is also worth noting that these pullout forces can be measured with respect to the entire cable. For a central tube cable embodiment, the pullout force with respect to the cable can be about the same as the pullout force with respect to a buffer tube. For a stranded cable embodiment, the pullout force with respect to the cable can be greater than the pullout force with respect to one of the buffer tubes.

Applicants have identified a need for an optical cable (and method of making the same) comprising a buffer tube and water-blocking plugs (i.e., elements) that can effectively block water migration, including water with high ionic concentration, within the buffer tube and maintain a strong coupling bond, while minimizing the above shortcomings. In particular, Applicants have identified a need for a buffer tube with internal water-blocking provisions that may: (1) provide for effective coupling between the optical fibers to the buffer tube, (2) cushion the optical fiber(s) inside the buffer tube, (3) provide thermal stability for the transmission integrity of the optical data, (4) reduce the mess involved when accessing the optical fibers in the field, and (5) be manufactured more cheaply and easily.

More particularly, the Applicant identified the problem of having a high pullout force of an optical fiber from a buffer tube without subjecting the optical fiber to stress due to cable movement (e.g., during laying and/or operation of the cable).

The Applicant found that the above-mentioned problems could be solved by water-blocking plugs accomplishing an adhesion to optical fiber and buffer tube material such to provide a high pullout force, said water-blocking plugs having a deformability such to accommodate the optical fiber with respect to the movements (bend, pull, thermal deformation) of the cable without stress thereto.

SUMMARY

An embodiment described herein includes an optical fiber cable comprising at least one buffer tube that includes a plurality of water-blocking plugs (e.g., elements that physically block water migration) and an optical fiber. The water-blocking plugs are spaced along the buffer tubes, substantially filling the cross-sectional space within the buffer tube not already filled by the optical fiber. As compared to current practices, the water-blocking plugs can provide a stronger coupling between the optical fiber(s) and the inner tube, resulting in a pullout force from a buffer tube of above about 5.0 N/m while still allowing the optical fibers to be accommodated without stress within the buffer tube. In another embodiment, the pullout force is with respect to an optical fiber cable.

Such a coupling can be achieved because the water-blocking plugs, consistent with one embodiment, comprise a filling material that is firmer than available thixotropic gels, yet softer than solid water-blocking plugs in the art. This increased softness affords the necessary flexibility that allows for greater strength coupling without the introduction of negative attenuation and microbending effects. At the same time, the water-blocking plugs in an embodiment have the mechanical characteristics to hold up as plugs in the buffer tubes and reduce the potential mess associated with thixotropic gels.

In one embodiment, the water-blocking plugs comprise a solid filling material, such as a class of rubberized hydrocarbons, or a foamed polymeric material, preferably of closed-cell type. The deformability (or softness) of the filling material can be measured in terms of "cone penetration" (the force required to penetrate the material with a standardized cone), with cone penetration values less than those of typical gels. For example, in one implementation, the solid filling material has a cone penetration (measured according to ASTM D217) of from 90 mm·$10^{-1}$ to 150 mm·$10^{-1}$ at +25° C. The solid filling material can also have a measured stress that is lower than solid water-blocking plugs described in the art, but higher than thixotropic gels under a similar compressive strain. In one embodiment, the water-blocking plug comprises a filling material having a measured stress at −40° C. from 0.3 atm to 1.1 atm (5 to 15 psi as equivalent) at a compressive strain of 10%.

The optical fiber coupled to the buffer tube may be part of at least one optical fiber ribbon arranged in a ribbon stack. In contrast with current fiber optic cables, the added coupling strength provided by the water-blocking plugs consistent with an embodiment of the present invention allows an optical fiber ribbon stack to have an S-Z lay within the buffer tube in one embodiment, which is difficult or impossible to accomplish or maintain in cables employing thixotropic gel or SAP elements.

In one embodiment, the optical fiber cable may include additional elements, such as a strength system, an outer jacket; and/or a water-swellable water-blocking means to block water migration in any interstices or any other empty spaces between the buffer tube and the outer jacket.

In a further aspect, a method of making an optical cable comprising a buffer tube containing optical fibers and water blocking plugs at intervals can be performed by advancing the relevant materials through an apparatus containing an inner tube and an outer tube. In one embodiment, the inner tube can be concentrically contained within the outer tube, and at least one optical fiber can be advanced through the inner tube towards an extrusion head. The extrusion head can include a tip and a die.

Consistent with this method of manufacture, the solid filling material used for the water-blocking plugs can be melted into (or provided in) a liquid form. While in liquid form, the filling material can be periodically pumped into the outer tube (concentric around the inner tube). In one embodiment, the method also includes porting air into the passageway between the outside of the outer tube and the tip. In addition, the method can include extruding a buffer material into tubular form over the optical fiber(s), the filling material, and the air. The buffer tube can define a cross-sectional space within the optical cable, and one or more fibers can be positioned in the space. The buffer tube can be extruded over all these other materials at substantially the same time, with the at least one optical fiber, the solid filling material and the air advancing beyond the tip and the die, thereby forming a buffer tube around the optical fiber(s). Finally, the buffer tube and its inner components can be advanced into a cooling trough.

In one embodiment, pressure inside the buffer tube is maintained at least substantially the same as the pressure outside the buffer tube, to prevent collapse of the buffer tube before cooling over the spaces between water-blocking plugs.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
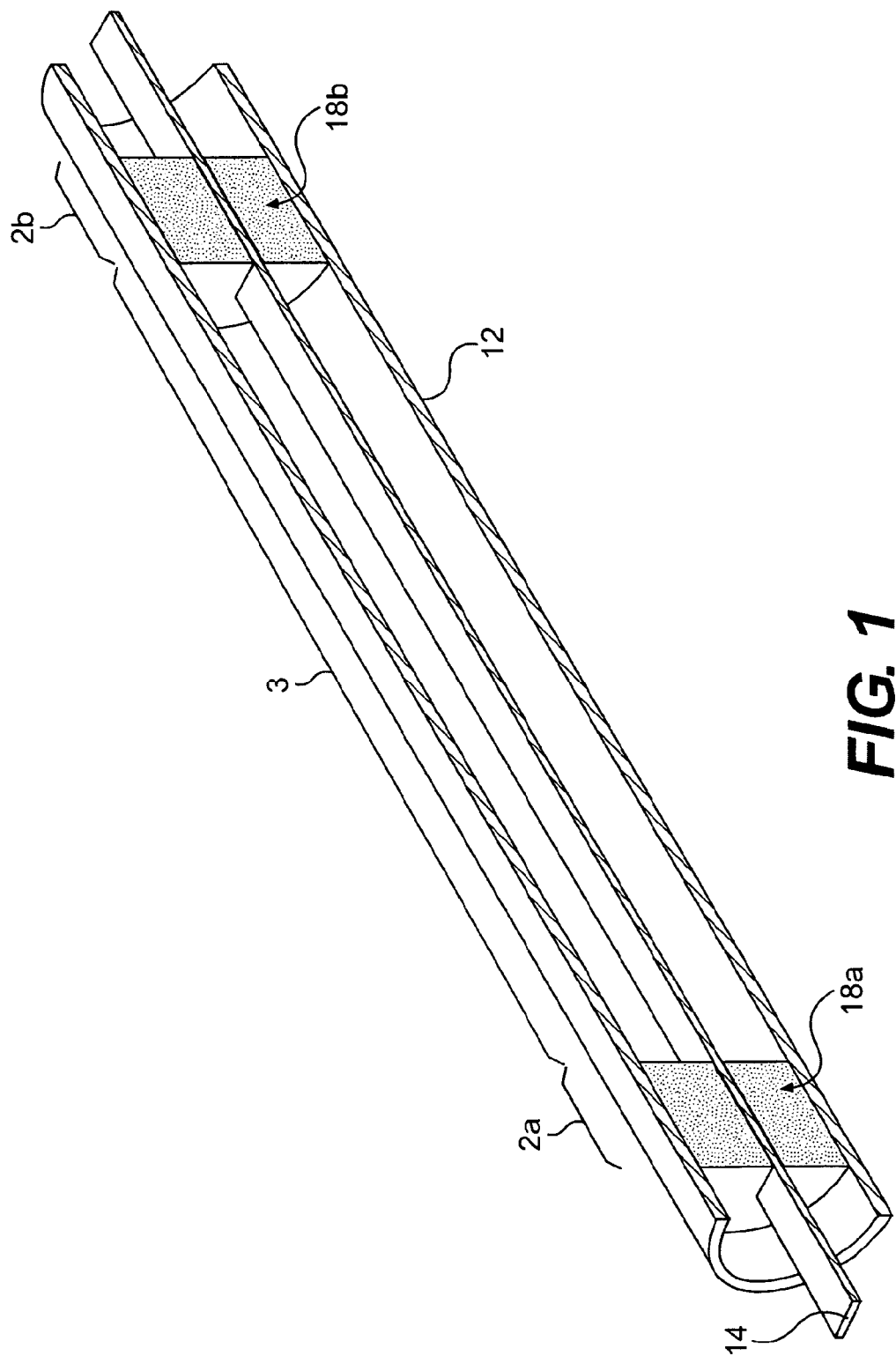
FIG. 1 is an exemplary sectioned isometric view of a buffer tube employed in an optical fiber cable, having a solid filling material to block water spaced at intervals along the buffer tube length, in accordance with an embodiment.

Reference will now be made in detail to present embodiments, examples of which are illustrated in the accompanying drawings. Wherever possible, the same reference numbers will be used throughout the drawings to refer to the same or like parts.

For the purposes of the present description and of the claims that follow, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

Additionally, while certain types of optical cables are described for illustrative purposes, the embodiments and advances disclosed herein apply to any type of optical cable. Indeed, the goal of blocking water migration applies to any type of optical cable. In addition, the terms "optical cable," "fiber optic cable," and "optical fiber cable" are used interchangeably herein. An optical cable can comprise a buffer tube or, in an embodiment, can refer to the buffer tube itself.

Though not limiting to the embodiments, two types of dry fiber optic cables discussed herein for purposes of illustration are: (1) central loose tube cables, and (2) stranded loose tube cables. With respect to both cable types, blocking the migration of water in both cable types can prevent damage to the integrity and/or attenuation properties of the optical fiber cable systems.

A central loose tube cable includes one buffer tube made of plastic or other material, while a stranded loose tube cable can include multiple buffer tubes. In a central loose tube cable, the buffer tube aligns coaxially with the central loose tube cable axis, and loosely receives one or more optical fibers. Conversely, in a stranded loose tube cable, there is a central strength member for resisting such forces, and a plurality of buffer tubes wound around the strength member. The buffer tubes are typically wound helically or in S-Z orientation. In either case, the buffer tube can contain a plurality of optical fibers, which can be aligned in side-by-side relation in one or more ribbons. In one embodiment, the buffer tube contains multiple fiber ribbons, which are stacked upon each other to form a ribbon stack. Prior to the embodiments described herein, the S-Z-lay ribbon stack configurations were difficult or impossible to accomplish or maintain using thixotropic gel or non-compressed SAP elements to couple the ribbons to the buffer tube. But with the coupling properties of the water-blocking plugs in an embodiment disclosed herein, both S-Z and helical stranding of the ribbon stack is possible. An S-Z lay can allow for faster manufacturing and ease of midspan access in applications where easy midspan access of the cable is required.

Optical fiber cables should resist tensile and compressive forces applied to the cable. For this reason, a strength member system exterior to the buffer tube is employed, encircled by an overall jacket.

In one embodiment, a buffer tube of an optical fiber cable contains water-blocking plugs spaced at longitudinal intervals throughout the buffer tube. These water-blocking plugs are used as "filling" materials, meaning they block water migration on the interior of the buffer tubes. While they may also be used as "flooding" materials, blocking water migration on the exterior of the buffer tubes, the embodiments are primarily directed to the advances associated with using the blocking plugs described herein as filling materials.

In one embodiment, the characteristics of the solid filling material allow the water-blocking plugs to couple the optical fiber(s) to the buffer tube, providing a pullout force of greater than 5 N/m and greater than preferably 8 N/m. This coupling does not cause attenuation, breakage, or other negative effects of the coupling values previously of concern to those skilled in the art. This surprising result is partially due to the flexible characteristics of the water-blocking plugs described herein that cushion the optical fibers and allow the fiber(s) to bend radially while remaining substantially in place longitudinally.

This high pullout force can be achieved in one embodiment because of the particular characteristics of the water-blocking plugs, which are described in detail below. In one embodiment, the water-blocking plugs are softer than water-blocking plugs known in the art, yet harder than thixotropic gels. The resulting consistency allows the water-blocking plugs to grip the buffer tube and optical fibers through friction without the negative effects associated with the more rigid water-blocking plugs in the prior art.

Referring now to the exemplary embodiment of FIG. 1, a ribbon of optical fibers 14 is disposed in a buffer tube 12. Water-blocking plugs 18a and 18b for inhibiting water migration are disposed at intervals within the buffer tube 12 and substantially fill the cross-sectional area of the buffer tube 12 not occupied by the optical fibers 14. The water-blocking plugs 18a and 18b only fill the cross-sectional area of the buffer tube 12 for one or more regularly or irregularly spaced portions along the longitudinal length of the buffer tube 12.

The buffer tube 12 according to one embodiment may be made from conventional buffer tube material(s) generally used for buffer tubes, as known in the art. For example, the buffer tube 12 may be made of polybutylene terephthalate (PBT), polyethylene (PE), polypropylene (PP), polypropylene-polyethylene copolymers (PP-PE), or polypropylene with a modified polyphenylene oxide. However, these are just examples, and other buffer materials known in the art may also be used in an embodiment. The buffer tube material can define a cross-sectional space within the buffer tube 12, in which the optical fiber 14 and water-blocking plugs 18a and 18b are contained.

With respect to these buffer tube materials, the water-blocking plugs 18a and 18b can create an effective coupling bond between the optical fiber(s) and the buffer tube. In addition, the water-blocking plugs 18a and 18b can cushion the optical fibers 14, while also blocking water migration in the buffer tube 12. The coupling properties of the water-blocking plugs according to one implementation allow the manufacturing of an optical fiber cable containing a ribbon stack having an S-Z lay. The S-Z lay can also be advantageous in applications where easy midspan access of the cable is required.

A water-blocking plug 18a can be made of a solid filling material based on a rubberized hydrocarbon or closed-cell foamed polymeric material. In one implementation, the solid filling material has a cone penetration (measured according to ASTM D217) of from about 90 mm·$10^{-1}$ (i.e., 90 deci-millimeters) to 150 mm·$10^{-1}$ at +25° C. In another implementation, the solid filling material has a cone penetration (measured according to ASTM D217) of at least 40 mm·$10^{-1}$ at −40° C. In yet another implementation, the cone penetration is at least 50 mm·$10^{-1}$ at −40° C. The cone penetration of this solid material does not exceed 125 mm·$10^{-1}$ at −40° C. in still another implementation. These cone penetration values are less than for thixotropic gels, but more than for water-blocking plugs in the art. For example, Unigel 400N gel (one type of thixotropic gel) has a cone penetration of 460 mm·$10^{-1}$ at +25° C., and more than 260 mm·$10^{-1}$ at −40° C. As these values exemplify, the solid filling material can be softer than water-blocking plugs known in the art while having more rigidity than thixotropic gels.

Although a solid filling material having a cone penetration of greater than 40 mm·$10^{-1}$ and less than 125 mm·$10^{-1}$ at −40° C. is used in one embodiment due to its ease of processing and elastomeric properties, other materials are also contemplated. For example, a harder material having a cone penetration of less than 40 mm·$10^{-1}$ at −40° C. may be suitable as a solid filling material in one embodiment. However, the harder filling material may require a shorter the plug length than for softer materials to ensure optical attenuation is not increased. For example, a silicone rubber may be used, but in order to assure both high pullout force and low attenuation, the plug length would be from about 1 to 6 cm in length. Other elastomerics may also be employed as long as they meet the general criteria for temperature range.

The characteristics of the solid filling material can also be described in terms of stress due to a compressive strain. In one embodiment, the buffer tube includes a solid filling material having a measured stress at −40° C. from 0.3 atm (roughly equivalent to 5 psi) to 1.1 atm (roughly equivalent to 15 psi) at a compressive strain of 10%. In another implementation, the solid filling material has a stress from 0.3 atm (roughly equivalent to 5 psi) to about 3.4 atm (roughly equivalent to 50 psi) at a compressive strain of 25%. The solid filling material has a stress of 0.3 atm (roughly equivalent to 5 psi) to about 7.0 atm (roughly equivalent to 100 psi) at a compressive strain of 50% in an another implementation. This stress is measured according to ASTM D3575 with cylindrical samples of diameter 1.4 cm and height of 1 cm.

In one embodiment, the water-blocking plugs are made of a solid filling material based on Unigel® Unibloc, a product from Shenzhen Unigel Telecommunications Co. Ltd. (commercially available from T&T Marketing of Allamuchy, N.J.). This product has been used and marketed as a "flooding" agent (i.e., to block water migration outside of the buffer tubes), but never as a "filling" material inside the buffer tubes. Unigel® Unibloc material has a cone penetration of 121 mm·$10^{-1}$ at +25° C. and of 62 mm·$10^{-1}$ at −40° C. This material has a measured stress at −40° C. of 0.744 atm (10.9 psi) at a compressive strain of 10%; of 1.76 atm (25.9 psi) at a compressive strain of 25%; and of 3.87 atm (56.8 psi) at a compressive strain of 50%.

Alternatively, the water-blocking plug (18) can be made of a solid filling material in the form of a closed-cell foam. Closed-cell foams are prepared by treating a polymeric material with a foaming agent, e.g. Hydrocerol® (Clariant Masterbatch GmbH) as is known in the art. While open cell foam allows the passage of water, closed cell foam does not.

The water-blocking plugs 18a and 18b substantially fill the cross-sectional area of the buffer tube 12 not occupied by the optical fibers 14. They can be spaced longitudinally along the buffer tube 12 at either regular or irregular intervals. As shown in FIG. 1, the longitudinal length 2a filled by a water-blocking plug 18a in the buffer tube 12 is less than about half the length of the interval 3 between the water-blocking plugs 18a and 18b. Stated another way, the spaced intervals are preferably at least two to three times greater than the longitudinal length of the water-blocking plug 18a. In one embodiment, such as with non-silicon water-blocking plugs, the length of water-blocking plug 18a or 18b may be as short as about 10 cm in length.

The spacing 3 between two water-blocking plugs 18a and 18b may be less than 1 meter without the use of SAP elements (e.g., yarns) for extra water-blocking protection. For the purposes of coupling the optical fiber(s) to the buffer tube, the spacing can be greater than 1 meter. If the spacing is greater than 1 meter, other water-blocking means may be necessary in the buffer tube to pass water penetration tests. However, the water-blocking plugs 18a and 18b can still provide coupling for the at least one optical fiber.

Additionally, SAP elements, preferably in the form of powder, may be mixed with the solid filling material of the water-blocking plug 18a while in liquid form to enhance water-blocking ability of the water-blocking plug 18a, while maintaining acceptable pullout force characteristics. Further, one to about twelve SAP elements, such as yarns, can be longitudinally disposed in the buffer tube spaces 3 proximate to the optical fiber(s) 14. The number of SAP yarns can be based on the distance between water blocking plugs 18a and 18b and/or type of water the cable is expected to be exposed to. For example, 1-3 yarns may be used if the water blocking plugs are 1 meter or less apart and ionic contaminated or sea water is part of the cable environment although these yarns are not typically necessary, but for insurance. If water blocking plugs 18a and 18b are more than 1 meter apart 1-12 yarns may be employed.

The water-blocking plug length 2a is preferably of from 10 cm to 75 cm, and more preferably of from 15 cm to 25 cm, but could be as long as one half the interval 3 between water-blocking plugs 18a and 18b. Thus, an embodiment herein can eliminate the problems of using more SAP elements than are needed to block water in order to ensure coupling. The length and spacing of the water-blocking plugs are typically determined by the particular cable design and the customer application and installation condition.

As shown, the water-blocking plug 18a can surround and couple the optical fiber 14 to the buffer tube 12. In one embodiment, this coupling results in a normalized pullout force for an optical fiber cable of greater than 5 N/m. In another embodiment, the normalized pullout force is greater than 8 N/m for a single-tube construction employing optical fiber ribbons. As optical fiber ribbon counts get larger, pullout forces may exceed 8 N/m by significant amounts. This is because as the ribbon stack gets larger, the contact area with the water-blocking plugs increases, giving a larger pullout force.

In one embodiment, pullout force is measured with respect to the optical fiber cable. In another embodiment, the pullout force is measured with respect to the buffer tube containing the optical fiber.

For one embodiment, an exemplary pullout test conducted on a 26 meter length of single tube optical fiber ribbon cable containing a stack of six 12-fiber ribbons demonstrated about 244 N of force is required to initiate slippage of the ribbon from the water-blocking plug. Normalized over the length of the test sample, this test cable has a ribbon pullout force of 9.3 N/m. Cables with larger ribbon stacks generally have larger pullout forces, and cables with smaller ribbon stacks would generally have lower pullout forces.

Calculating the ribbon pullout force by the alternate method discussed hereinbefore, the ribbon pullout force for this 72-fiber ribbon cable is 244 N, well above the specification of 11.7 N required (0.1625 N times 72 fibers). The single tube cables can have ribbon pullout forces greater than about 150 N regardless of the number of optical fibers in the optical fiber ribbon.

These pullout tests demonstrate superior ribbon coupling to the buffer tube and the cable, when compared to existing cables and industry specifications. And this superior coupling is accomplished without adversely affecting optical attenuation.

In one embodiment, incorporating water-blocking plugs having a cone penetration or stress measurements previously described are easily stripped from the optical fibers without leaving a residue. The filling material can couple more tightly with the buffer tube than the optical fiber, causing the filling material to substantially stay with the buffer tube during stripping. The surface of the buffer tube can be rougher than that of the optical fibers, leading to the difference in coupling strength based on friction. As a result, the optical fibers do not require the cleaning that is characteristic of thixotropic gels.

The water-blocking plugs 18a and 18b cushion the optical fiber(s), couple the optical fibers to the buffer tube, leave no significant residue on the optical fibers when the optical fibers are accessed, and block water effectively by itself even in the absence of SAP elements.

The coupling of the optical fiber 14 to the buffer tube 12 exhibits a high pullout force without compromising optical performance as it will be described in detail. The high pullout force of the cable can allow for the installation of said cable in critical environments (with elevation changes, or aerial and below grade installations) where the relative movement between the optical fiber and the cable needs to be minimized.

The solid filling material adheres via friction and compression to the buffer tube 12 and holds the optical fiber 14, substantially inhibiting any movement around, about, or along the longitudinal axis of the buffer tube. This adhesion is at least partly due to the cable manufacture method, discussed in more detail below.

Cables according to one or more of the embodiments herein also react well to temperature cycling. Industry standards, namely, Telecordia Standard GR20 require outdoor optical fiber cables to be temperature cycled between −40° C. and +70° C. on a cable reel to ensure good temperature and aging performance. The Telecordia GR20 specification requires that 90% of the optical fibers have an average change of attenuation of less than or equal to 0.05 dB/km with the largest change to be less than or equal to 0.15 dB/km at the temperature extremes. A cable, in accordance with at least one embodiment, comprised of a stack of six 12-fiber ribbons disposed in a buffer tube with water-blocking plugs of 66 cm spaced 1.5 meters apart was temperature cycled and tested according the Telecordia GR20 specification. Five of the optical fiber ribbons were dummy fibers and therefore not tested. The bottom ribbon of the stack had live fibers, which were tested. Data from the test are presented in Table 1, below. As can be seen from the data, the cable met the Telecordia GR20 specification.

TABLE 1

| Telecordia GR-20 (−40° C. to +70° C. cycling attenuation data) | | | | |
|---|---|---|---|---|
| Fiber Color | +23° C. dB/km | +70° C. dB/km | Delta dB/km | −40° C. dB/km | Delta dB/km |
| Blue | 0.21 | 0.20 | −0.01 | 0.21 | 0.00 |
| Orange | 0.20 | 0.20 | 0.00 | 0.19 | −0.01 |
| Green | 0.19 | 0.19 | 0.00 | 0.20 | 0.01 |
| Brown | 0.19 | 0.19 | 0.00 | 0.18 | −0.01 |
| Slate | 0.19 | 0.19 | 0.00 | 0.18 | −0.01 |
| White | 0.19 | 0.20 | 0.01 | 0.18 | −0.01 |
| Red | 0.18 | 0.20 | 0.02 | 0.20 | 0.02 |
| Black | 0.19 | 0.19 | 0.00 | 0.19 | 0.00 |
| Yellow | 0.19 | 0.20 | 0.01 | 0.20 | 0.01 |
| Violet | 0.19 | 0.20 | 0.01 | 0.19 | 0.00 |
| Rose | 0.19 | 0.19 | 0.00 | 0.19 | 0.00 |
| Aqua | 0.20 | 0.20 | 0.00 | 0.19 | −0.01 |

Figure 2:
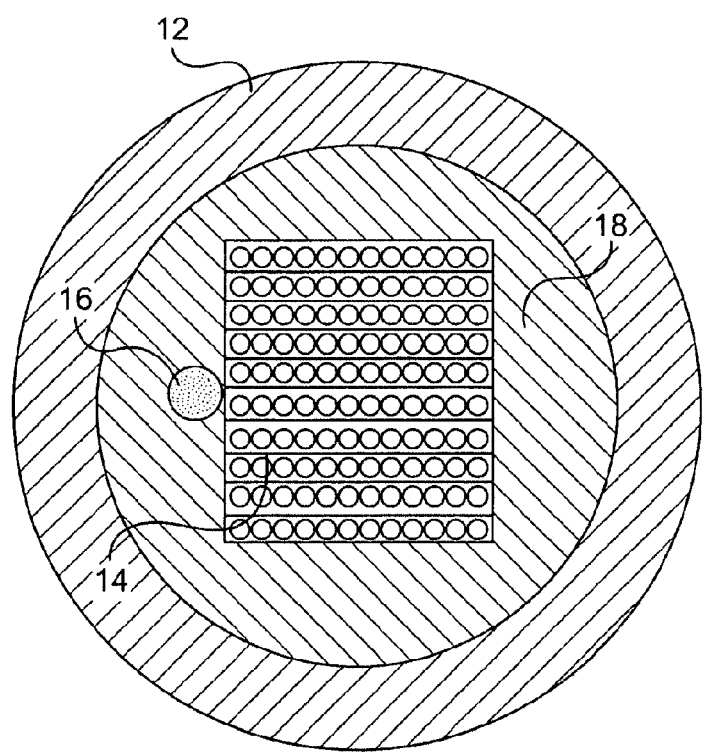
FIG. 2 is an exemplary cross-sectional view of a buffer tube employed in an optical fiber cable, in accordance with an embodiment.

Referring now to FIG. 2, and as previously mentioned, water blocking within the buffer tube 12 can be enhanced by disposing one or more SAP elements 16 longitudinally within the buffer tube 12. One possible SAP element 16 is a yarn impregnated with water-swellable powder. One or more SAP yarns may be used, the number being typically selected in view of the environment in which the cable is to be installed. In one embodiment, 2 to 3 SAP yarns 16 are disposed longitudinally in the buffer tube 12.

In another embodiment, from 1 to 5 SAP yarns may be longitudinally disposed inside the buffer tube, in addition to the water-blocking plugs. This low number of yarns enhances water-blocking capabilities of the cable without adversely affecting the cable size or the optical performance of the cable as discussed hereinbefore when large numbers of SAP elements are present.

Figure 3:
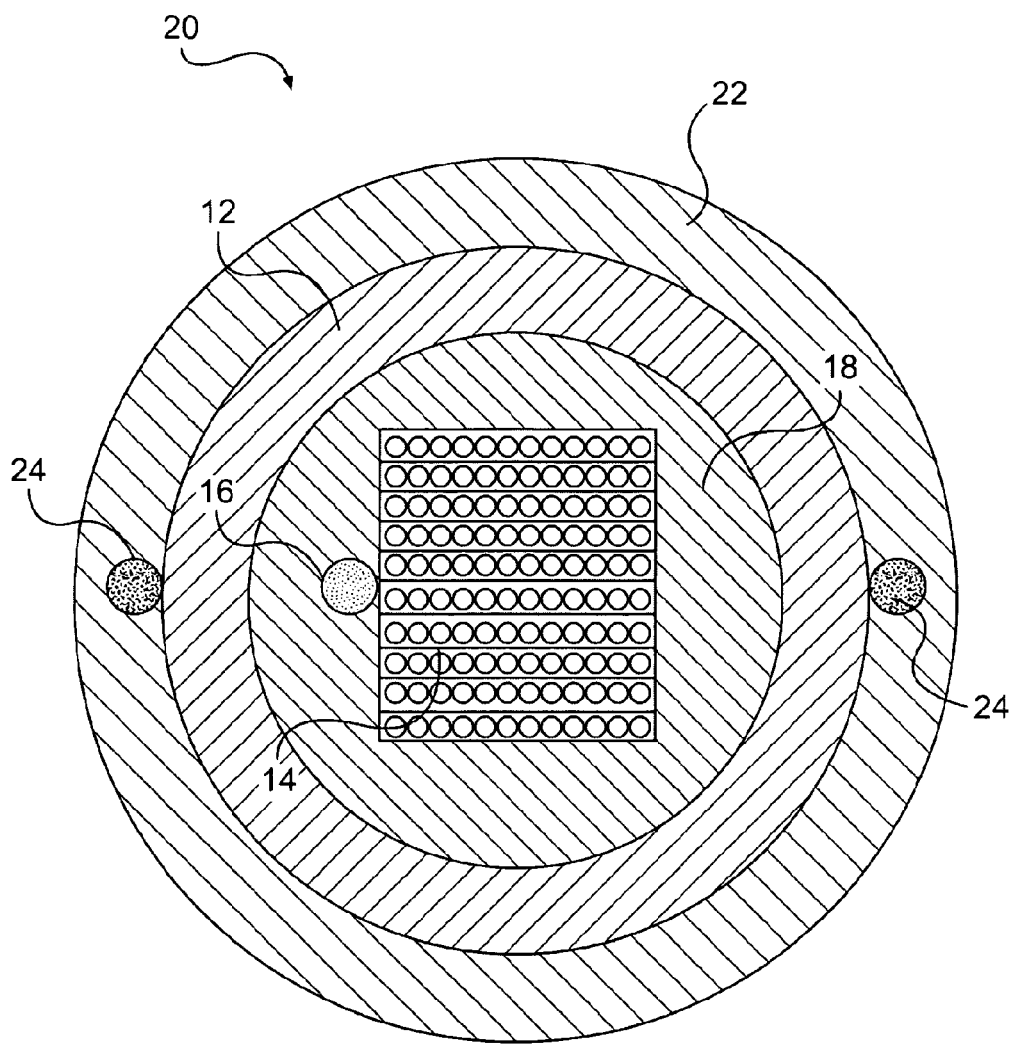
FIG. 3 is an exemplary cross-sectional view of one embodiment of the optical fiber cable, in accordance with an embodiment.

Referring now to FIG. 3, a cross-sectional view of an optical fiber cable 20 having a jacket 22 and strength members 24 is illustrated. While the illustrated cable 20 only contains one buffer tube 12, other embodiments can contain a plurality of buffer tubes 12. As illustrated, a longitudinally disposed SAP element 16 is included and proximate to the optical fibers 14. The jacket 22 can comprise standard materials known in the art for cable jacketing. As shown, the jacket 22 can surround the buffer tube 12. While not shown, other elements, such as SAP yarn or tape, can be interposed between the buffer tube 12 and the jacket 22.

A strength member system 24 can provide extra stability to the cable, further preventing attenuation. As shown in FIG. 3, the strength member system 24 can comprise two diametrically opposed rods embedded in the jacket. However, other strength member arrangements are possible.

In an embodiment, a plurality of buffer tubes may be stranded together in a helical or reverse oscillating lay around a central strength member. An overall jacket 22 can enclose the stranded buffer tubes, central strength member, and SAP elements (if any).

Figure 4:
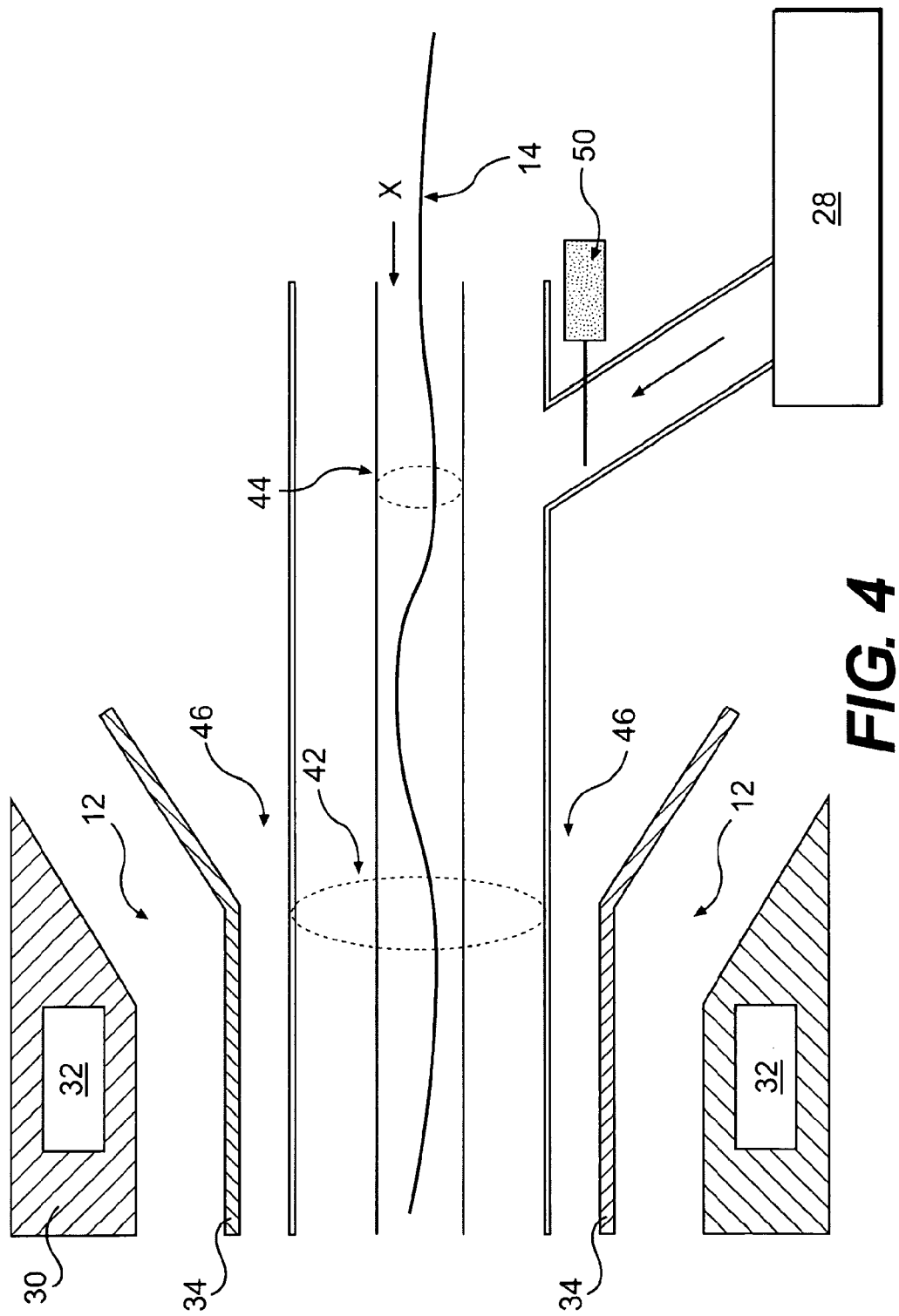
FIG. 4 is an exemplary schematic illustrating the apparatus used in a method of making a buffer tube and/or optical fiber cable, in accordance with an embodiment.
Figure 5:
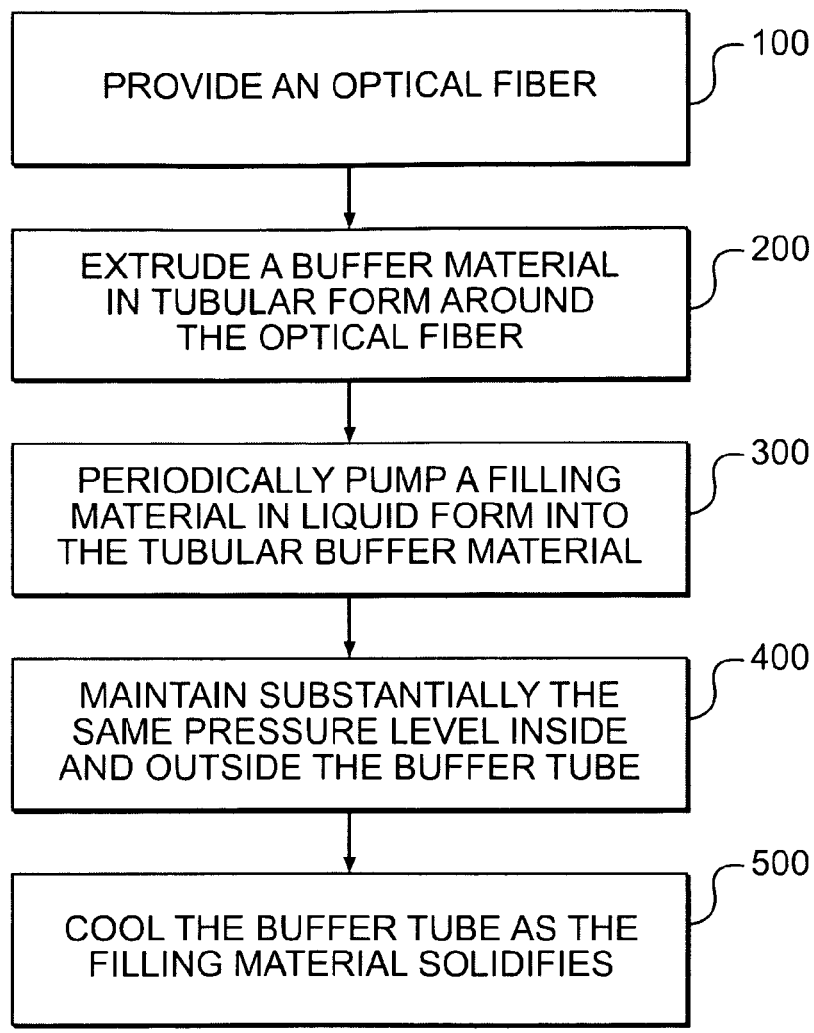
FIG. 5 is an exemplary flow chart comprising exemplary steps for making a buffer tube and/or optical fiber cable, in accordance with an embodiment.

FIG. 4 is a schematic of the apparatus used to make buffer tubes and/or fiber optic cables in accordance with an embodiment. It will be discussed simultaneously with FIG. 5, which is a flow chart comprising exemplary steps for making buffer tubes and/or fiber optic cables in accordance with an embodiment.

In one aspect, the method of making a buffer tube containing water-blocking plugs and optical fibers includes providing an optical fiber, as indicated at step 100. Provision of the optical fiber can include advancing at least one optical fiber 14 in an inner tube 44 towards an extrusion head 30. The inner tube 44 is disposed within an outer tube 42, which receives the material used to form the water-blocking plugs. Both tubes 42 and 44 culminate at an extrusion head comprised of a tip 34 and a die 32.

In one embodiment, as the optical fiber is fed into the inner tube 44, air can also vent into the inner tube 44 (in the direction of the arrow X). Alternatively or in addition, the method can also include porting air into the passageway 46 between the outside of the outer tube 42 and the tip 34.

Further, one or more SAP elements may be advanced with the at least one optical fiber in another implementation. Alternatively or optionally SAP can be powder dusted on the optical fiber ribbons and may be employed in the empty spaces between the plugs. However, the SAP elements are not always necessary to pass industry standard water penetration tests, but may be used for extra protection.

Turning to step 200, in one embodiment, the manufacturing method can include the step of extruding a buffer material in tubular form around the optical fiber. As previously mentioned, the buffer tube may be of a buffer tube material selected from polybutylene terephthalate (PBT), polyethylene (PE), polypropylene (PP), polypropylene-polyethylene copolymers (PP-PE), or polyethylene or polypropylene with a modified polyphenylene oxide. However, any material known in the art for creating buffer tubes can be used in the alternative.

At exemplary step 300, a filling material can be periodically pumped into the buffer tube. This can be done by melting a solid filling material 28 into liquid form, and periodically pumping the liquid form into the outer tube to form the water-blocking plugs 18a and 18b. A switched valve 50 can be employed to control the longitudinal length of the water-blocking plug formed from the solid filling material 28 and the spacing of interval of the water-blocking plugs within the buffer tube in the step of periodically pumping the solid filling material in liquid form. SAP powder may be mixed with the filling material before it is pumped into the buffer tube during extrusion.

In one embodiment, steps 100, 200, and 300 occur substantially simultaneously. For example, while the optical fiber 14 is advanced and the liquid form of the filling material is periodically pumped, a buffer tube material 25 is extruded in tubular form over the optical fiber 14, the water-blocking plugs 18a and 18b, and the air venting out of the inner 44 and outer tubes 42 beyond the tip 34 and die 32.

Because the buffer tubes are neither fully filled (e.g., with a grease or gel) nor significantly but partially filled with continuously provided SAP elements, there is a risk that the buffer tube may collapse during the extrusion of the buffer material at the portions of the buffer tube lacking a plug of solid filling material for support. For this reason, at step 400, one embodiment includes maintaining at least substantially the same pressure inside the buffer tube as outside the buffer tube during extrusion of the buffer material. The requisite pressure can be maintained, for example, by allowing air to flow inside the buffer tube from the air port 46. If the air is forced into the tube, the pressure can be greater inside than outside. Alternatively, if the air freely flows into the tube, the pressure inside and outside can be substantially equal.

At step 500, the buffer material can be cooled as the filling material solidifies. This is accomplished, in one embodiment, by advancing into a cooling trough (not shown) the buffer tube and its contents. This allows the buffer tube 12 to form around the optical fiber 14, water-blocking plugs, and any other contents. In another method, the buffer tube 12 is air dried for a period and/or advanced into the cooling trough at some later time. The liquid form of the filling material eventually solidifies into a plug as the buffer tube cools. The shrinkage of the buffer tube and the solid filling material tighten the coupling of the optical fiber, solid filling material, and the tube. The elastic properties of the solid filling material allow it to deform with the buffer tube, while still cushioning the optical fiber and coupling the optical fiber to the buffer tube.

In summary, an embodiment disclosed herein allows for providing a buffer tube containing water-blocking plugs with particular characteristics that allow for a stronger coupling between the optical fiber and the inner wall of the buffer tube without causing unwanted attenuation. The water-blocking plugs can comprise a filling material that is softer than previous water-blocking plugs, yet firm enough to hold up as a plug within the buffer tube. The added softness cushions the optical fiber and the periodic nature of the water blocking plugs allow the optical fiber to move within the buffer tube, but couples the optical fiber strongly to the buffer tube. Therefore, those in the art need not fear pullout forces greater than 5 N/m, and instead can embrace the advantages of higher pullout forces. Additionally, unlike thixotropic gels, the filling material can strip cleanly with the buffer tube, preventing a mess during access to fibers or ribbons.

The water-blocking plugs of one embodiment also can allow for easier manufacturing of an optical fiber cable, because the filling material can be pumped into the buffer tube in liquid form, creating a strong coupling bond with the buffer tube as both solidify together. This manufacturing improvement saves costs as compared to the techniques used in the art for providing water-blocking plugs inside a buffer tube.

Other modifications and embodiments of the present invention are possible. It is to be understood that the invention is not limited to the embodiments shown and described herein.

What is claimed is:

1. An optical cable comprising:
    a buffer tube defining a cross-sectional space within the optical cable;
    an optical fiber, at least a portion of which is surrounded by the buffer tube and oriented longitudinally within the optical fiber cable; and
    a plurality of water-blocking plugs comprising a solid filling material having a cone penetration of at least 40 mm·10$^{-1}$ and less than 125 mm·10$^{-1}$ at −40° C., each of the plurality of water-blocking plugs having a longitudinal length, with two consecutive water-blocking plugs being separated from each other over a longitudinal interval,
    wherein the water-blocking plugs are coupled to the optical fiber and the buffer tube.

2. The optical cable of claim 1, wherein the longitudinal interval between the two consecutive water-blocking plugs is at least twice as long as the longitudinal length of either of the consecutive water-blocking plugs.

3. The optical cable of claim 1, wherein the longitudinal lengths of the water-blocking plugs are greater than 10 cm.

4. The optical cable of claim 1, wherein coupling the water-blocking plugs to the buffer tube results in a pullout force from the buffer tube of greater than 5 N/m for the optical fiber.

5. The optical cable of claim 1, wherein coupling the water-blocking plugs to the buffer tube results in a pullout force from the buffer tube of at least 8 N/m for the optical fiber.

6. The optical cable of claim 1, wherein the solid filling material has a cone penetration of at least 50 mm·10$^{-1}$ and less than 125 mm·10$^{-1}$ at −40° C.

7. The optical cable of claim 1, wherein the solid filling material has a measured stress between 0.3 atm to 1.1 atm when at a compressive strain of 10% and a temperature of −40° C.

8. The optical cable of claim 1, wherein the optical fiber is part of a ribbon stack in S-Z lay orientation.

9. A method for manufacturing an optical cable, comprising:
    providing an optical fiber;
    extruding a buffer tube into tubular form concentric around the optical fiber such that the optical fiber is within an inner passageway of the buffer tube;
    periodically pumping a filling material in liquid form into the inner passageway of the buffer tube, filling sections of the buffer tube with the filling material and leaving intervals of the buffer tube without filling material, the filling material having a measured stress between 0.3 atm to 1.1 atm when at a compressive strain of 10% and a temperature of −40° C.;
    maintaining at least substantially the same pressure inside the buffer tube as compared to outside the buffer tube over the intervals where no filling material is pumped into the buffer tube; and
    cooling the buffer tube as the filling material solidifies, the filling material being solid at room temperature.

10. The method of claim 9, further comprising advancing the optical fiber in an inner tube towards an extrusion head, wherein the filling material is periodically pumped into an outer tube concentric around the inner tube, and wherein extruding the buffer tube occurs substantially simultaneously with the advancing of the optical fiber and the periodic pumping of the filling material.

11. The method of claim 10, wherein the extrusion head includes a tip concentric around the outer tube, further comprising
    forming a passageway between the tip and the outer tube, and
    porting air into the passageway.

12. The method of claim 9, further comprising mixing an SAP element with the liquid form of the filling material.

13. An optical cable, comprising:
    a jacket;
    at least one buffer tube surrounded by the jacket, each buffer tube concentrically surrounding at least one optical fiber; and
    a plurality of water-blocking plugs comprising a solid filling material having a cone penetration of at least 40 mm·10$^{-1}$ at −40° C., the water-blocking plugs being spaced at longitudinal intervals along at least one of the buffer tubes, wherein the water blocking plugs couple the optical fiber to the buffer tube, providing a normalized pullout force of the at least one optical fiber of greater than 5.0 N/m from the fiber optic cable.

14. The fiber optic cable of claim 13, wherein the at least one optical fiber comprises a ribbon stack in S-Z lay orientation.

15. An optical cable, comprising:
a buffer tube defining a cross-sectional space within the optical cable;
an optical fiber, at least a portion of which is surrounded by the buffer tube and oriented longitudinally within the optical cable; and
a plurality of water-blocking plugs comprising a solid filling material, each of the plurality of water-blocking plugs having a longitudinal length, with two consecutive water-blocking plugs being separated from each other over a longitudinal interval,
wherein the water-blocking plugs are coupled to the optical fiber and the buffer tube, resulting in a pullout force from the buffer tube of greater than 5 N/m.

16. The optical cable of claim 15, further comprising a stranded loose tube configuration.

17. The optical cable of claim 15, wherein the solid filling material is a liquid when initially injected into the buffer tube.

18. The optical cable of claim 15, further comprising at least one SAP yarn.

* * * * *